United States Patent [19]
Epstein et al.

[11] Patent Number: 5,802,392
[45] Date of Patent: Sep. 1, 1998

[54] SYSTEM FOR TRANSFERRING 32-BIT DOUBLE WORD IDE DATA SEQUENTIALLY WITHOUT AN INTERVENING INSTRUCTION BY AUTOMATICALLY INCREMENTING I/O PORT ADDRESS AND TRANSLATING INCREMENTED ADDRESS

[75] Inventors: Jeffrey E. Epstein, Laguna Niguel; Mark F. Heppenstall, Irvine, both of Calif.

[73] Assignee: Future Domain Corporation, Irvine, Calif.

[21] Appl. No.: 504,921

[22] Filed: Jul. 20, 1995

[51] Int. Cl.⁶ .............. G06F 11/16; G06F 13/20
[52] U.S. Cl. .......... 395/824; 395/307; 395/854; 395/872
[58] Field of Search .............. 395/872, 854, 395/306, 433, 250, 841, 827, 824, 307

[56] References Cited

U.S. PATENT DOCUMENTS

| | | |
|---|---|---|
| 4,438,512 | 3/1984 | Hartnug et al. ............... 371/60 |
| 4,905,184 | 2/1990 | Giridhar et al. ............... 364/900 |
| 5,295,247 | 3/1994 | Chang et al. ............... 395/325 |
| 5,581,715 | 12/1996 | Verinsky et al. ............... 395/309 |
| 5,592,682 | 1/1997 | Chejlava, Jr. et al. ............... 395/823 |

*Primary Examiner*—Thomas C. Lee
*Assistant Examiner*—Rehana Perveen
*Attorney, Agent, or Firm*—Christie, Parker & Hale, LLP

[57] ABSTRACT

A system is provided for transferring 32-bit data words between a 32-bit host personal computer and an IDE peripheral storage device adapted to transfer data as 16-bit words and store the data in a data register identified by an offset address. The system microprocessor transfers 32-bit data words from an internal 32-bit data transfer register in two sequential 16-bit words without an intervening input or output instruction and automatically increments the offset address associated with the second 16-bit word. A device driver program or a peripheral BIOS directs the microprocessor to address data transfers from the 32-bit register to an alias address, the offset address portion of which is incremented for the second 16-bit word. An interface adapter circuit is provided which includes logic circuitry for recognizing an address as an alias, and translating the offset portion of the alias address to offset address associated with the peripheral's data register.

12 Claims, 3 Drawing Sheets

FIG.1

| I/O PORT OFFSET ADDRESS | I/O READ REGISTER | I/O WRITE REGISTER |
|---|---|---|
| xx0 | 16-BIT DATA | 16-BIT DATA |
| xx1 | ERROR | FEATURES |
| xx2 | SECTOR COUNT | SECTOR COUNT |
| xx3 | SECTOR NUM. | SECTOR NUM. |
| xx4 | CYLINDER LOW | CYLINDER LOW |
| xx5 | CYLINDER HIGH | CYLINDER HIGH |
| xx6 | DEVICE/HEAD | DEVICE/HEAD |
| xx7 | STATUS | COMMAND |

FIG.2

| REGISTER CONTENT | | µP INSTRUCTION | ISA BUS CONTENT | |
|---|---|---|---|---|
| Ax | Dx | | ADDRESS | DATA |
| WORD-1 | xxxx | MOV, Dx, 160 | | |
| WORD-1 | 160 | OUT, Ax, Dx | | |
| WORD-1 | 160 | (1st BUS CYCLE) | 160 | WORD-1 |
| WORD-2 | 160 | SHR, EAx, 16 | | |
| WORD-2 | 160 | OUT, Ax, Dx | | |
| WORD-2 | 160 | (2nd BUS CYCLE) | 160 | WORD-2 |

FIG.3

| REGISTER CONTENT | | μP INSTRUCTION | ISA BUS CONTENT | |
|---|---|---|---|---|
| EAx | Dx | | ADDRESS | DATA |
| WORD-2 | WORD-1 | xxxx MOV, Dx, 160 | | |
| WORD-2 | WORD-1 | 160 OUT, EAx, Dx | | |
| WORD-2 | WORD-1 | 160 (1st BUS CYCLE) | 160 | WORD-1 |
| WORD-2 | WORD-1 | 160 (2nd BUS CYCLE) | 162 | WORD-2 |

FIG.4

| I/O PORT OFFSET ADDRESS | I/O READ REGISTER | I/O WRITE REGISTER |
|---|---|---|
| xx0 | 16-BIT DATA | 16-BIT DATA |
| xx1 | ERROR | FEATURES |
| xx2 | SECTOR COUNT | SECTOR COUNT |
| xx3 | SECTOR NUM. | SECTOR NUM. |
| xx4 | CYLINDER LOW | CYLINDER LOW |
| xx5 | CYLINDER HIGH | CYLINDER HIGH |
| xx6 | DEVICE/HEAD | DEVICE/HEAD |
| xx7 | STATUS | COMMAND |
| xx8 | 16-BIT WORD-1 | 16-BIT WORD-1 |
| xx9 | N/A | N/A |
| xxA | 16-BIT WORD-2 | 16-BIT WORD-2 |
| xxB | N/A | N/A |
| xxC | N/A | N/A |
| xxD | N/A | N/A |
| xxE | N/A | N/A |
| xxF | N/A | N/A | ns for computer systems, it was felt that 16 bit wide data

SYSTEM FOR TRANSFERRING 32-BIT DOUBLE WORD IDE DATA SEQUENTIALLY WITHOUT AN INTERVENING INSTRUCTION BY AUTOMATICALLY INCREMENTING I/O PORT ADDRESS AND TRANSLATING INCREMENTED ADDRESS

FIELD OF THE INVENTION

This invention relates to a system for transferring a 32-bit data word to an IDE peripheral over a 16-bit ISA bus using a single microprocessor instruction.

BACKGROUND OF THE INVENTION

Most of the personal computer systems in use today, throughout the world, allow for expansion of their functional capabilities by providing a number of sockets, commonly termed expansion slots, on the computer's primary circuit board, into which add-on circuit boards, commonly termed expansion boards, may be inserted. Some of the more popular of these expansion boards include sound cards, enhanced graphics adapters, and I/O interface adapters which provide the capability for connecting peripheral storage units such as disk drives, CD-ROM drives, and the like, to the computer system. Although peripheral storage units are available in several architectures, the most prevalent peripheral devices operate in accordance with an architecture termed IDE, an acronym for Integrated Device Electronics, and communicate over a bus architecture termed the IDE bus. The IDE bus is an industry standard bus architecture constructed in accordance with an ANSI Standard specification.

The computer system's expansion slots are also coupled to the host computer system by a bus, but the bus architecture is quite different from the IDE bus. Several complex and highly capable bus architectures have been developed in recent years, but the basic bus architecture for most personal computers remains the ISA bus. ISA, as used herein, is an acronym standing for Industry Standard Architecture. The ISA bus is found in virtually all of the IBM-PC/AT type, and compatible, computers manufactured from their inception to the present.

A particular feature of the ISA bus is that it is only able to support 16-bit wide bi-directional data transfers on the parallel data portion of the bus. This is due to the historical evolution of personal computer bus architectures and the software application programs which they were designed to support. During the development of the IBM AT-series personal computer systems, it was felt that 16 bit wide data words would be sufficient for most, if not all, processing applications. Accordingly, the IBM-AT expansion bus, which was to become standardized as the ISA bus, was designed with a 16 bit wide data path.

More recently, advances in computer hardware and software have moved the capabilities of computer systems far beyond the arbitrary 16 -bit limit. Programs such as Windows, a graphical user interface, developed, made and sold by Microsoft Corp., are designed to operate using 32-bit data words. These programs were made possible by the introduction of the 32-bit microprocessor, such as the Intel 80486, made and sold by Intel Corp..

The ISA bus, however, remains as the basic personal computer bus structure, which is supported by all IBM-type computer systems as the default expansion bus. In addition, peripheral storage units, such as disk drives, commonly operate in conjunction with an IDE interface which was also adapted for 16-bit data word transfers.

Operating a 16 data bit peripheral device, such as an IDE disk drive, on the 16 data bit ISA bus, in combination with a 32-bit microprocessor and application program, has serious implications for the speed of data transfer between the computer system and the peripheral. Each 32-bit data word must be broken down into two sequential 16-bit words, and each word independently written to, or read from, the IDE peripheral. This two-step process results, naturally, from the 16-bit architecture of the IDE and ISA busses. However, data transfer is additionally slowed by the microprocessor's treating each 16-bit word individually. A separate instruction must be generated to write out, or read in, each word. Thus, two out, or in, instructions must be generated for each 32-bit word, resulting in slower data transfer times.

Because data transfer speed has become the hallmark of efficient computer operation, there is a need for a system which allows transfer of a 32-bit data word between a computer system and an IDE data storage peripheral, over a 16-bit ISA bus, without requiring multiple microprocessor instruction steps.

SUMMARY OF THE INVENTION

In accordance with the invention, a system is provided for transferring data expressed as 32-bit words between a host personal computer operative in a 32-bit mode and an IDE peripheral storage device adapted to transfer data as 16-bit words over an ISA bus, wherein data to be transferred is stored in an addressable register in the peripheral device in response to an offset address comprising a portion of the peripheral's I/O port address.

The system comprises microprocessor means, responsive to a microprocessor input or output instruction, for transferring 32-bit data words to or from the peripheral storage device. The microprocessor means transfers 32-bit data words from an internal 32-bit data transfer register in two sequential 16-bit words without an intervening input or output instruction. The first word is transferred to or from the peripheral, over an ISA bus, in association with the peripheral's I/O port address including the offset address defining the addressable register. The microprocessor means automatically increments the offset address portion associated with the second 16-bit word.

An interface adapter is coupled between the microprocessor and the IDE peripheral storage device which includes means for recognizing an incremented offset address portion of the I/O port address. Means are also provided for translating the incremented offset address portion to the offset address defining the peripheral's addressable register.

In particular, the invention provides means for defining an alias I/O port address which corresponds to a valid I/O port address. The microprocessor is instructed to associate the alias address with the 16-bit data words, rather than the valid I/O port address. The microprocessor then increments the offset address portion of the alias address. The interface adapter recognizes the port address as being an alias and translates the alias I/O port address to the valid I/O port address such that the offset address portion of both the first and second 16-bit words each corresponds to the offset address of the 16-bit data storage register.

BRIEF DESCRIPTION OF THE DRAWINGS

These and other features, aspects, and advantages of the present invention will be more fully understood when considered with respect to the following detailed description, appended claims, and accompanying drawings, wherein:

FIG. 1 is a table depicting the standard register set offset address definitions of an IDE task file in accordance with the prior art;

FIG. 2 is a table depicting the microprocessor and ISA bus instruction sequence required for transferring 32 bits of data from the host system to an IDE peripheral across a 16-bit bus in accordance with the prior art;

FIG. 3 is a table depicting an extended register set and its offset address definitions of an IDE task file in accordance with practice of principles of the invention;

FIG. 4 is a table depicting the microprocessor and ISA bus instruction sequence required for transferring 32 bits of data from the host system to an IDE peripheral across a 16-bit bus in accordance with practice of principles of the invention;

DETAILED DESCRIPTION

Figure 5:
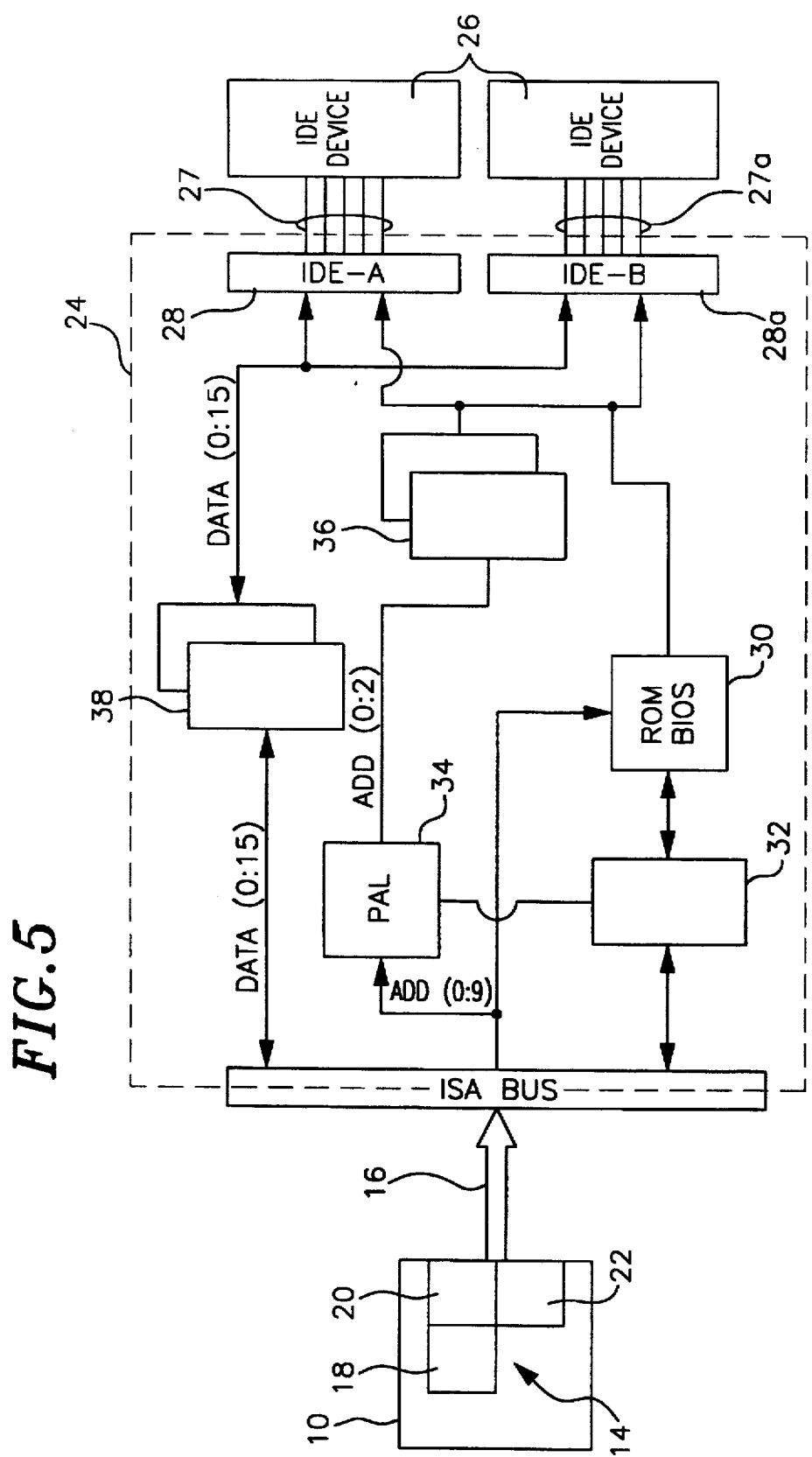
FIG. 5 is a block diagram of a computer system including an I/O interface adapter for translating alias addresses in accordance with the invention.

During a conventional I/O write cycle, an applications program will command the micro-processor to transfer data to an IDE peripheral, such as a disk drive. When an I/O write to an IDE peripheral device is desired, the appropriate command to the host microprocessor takes the form OUT, Ax,Dx, where OUT represents the operative command, Ax is a 16-bit data register, internal to the microprocessor, which contains the data to be transferred, and Dx is the I/O address to which the data is to be sent. In accordance with established rules, well known to those skilled in the art, the actual data transfer is preceded by an access command to the peripheral device, in which an I/O read or I/O write command is written to the device task file register set. As will also be well known to one skilled in the art, the Ax register is a virtual register which comprises the 16 least significant bits of a 32-bit microprocessor's 32-bit data register. As described in greater detail below, the full 32-bit data register is identified as EAx in instruction calls.

Each IDE peripheral device is provided with an instruction register set, conventionally termed a task file, which is identified by a set of contiguous I/O port addresses. A task file identifies a set of eight registers and is thus, accessed by a range of eight I/O addresses.

Turning now to FIG. 1, an exemplary standard IDE task file is shown, which is reproduced as Table 1, below.

TABLE 1

| I/O PORT OFFSET ADDRESS | I/O READ REGISTER | I/O WRITE REGISTER |
| --- | --- | --- |
| xx0 | 16-Bit Data | 16-Bit Data |
| xx1 | Error | Features |
| xx2 | Sector Count | Sector Count |
| xx3 | Sector Num. | Sector Num. |
| xx4 | Cylinder Low | Cylinder Low |
| xx5 | Cylinder High | Cylinder High |
| xx6 | Device/Head | Device/Head |
| xx7 | Status | Command |

In FIG. 1, and Table 1, the IDE task file defines a set of eight registers, with each of the eight registers being identified by a unique I/O port offset address which defines the I/O address of each register. In accordance with well understood convention, each register's function depends on whether data is being read from, or written to, the IDE peripheral. Thus, the task file register set definition is given for a data read operation under the READ column, and the register set definition is given for a data write operation under the WRITE column.

For example, in a data write operation, the 16-bit data register is accessed by addressing I/O Port Offset 0. Information to be directed to the features register is directed to offset address 1, sector count information is directed to offset address 2, the sector number is directed to offset address 3, and so forth, with the operative command, such as seek, write, write long, and the like, directed to the command register via offset address 7.

Since several IDE devices may be connected to the ISA bus of a host computer system, the first two digits of the I/O address are used to identify the peripheral device to which, or from which, the command or data is being transferred.

In the exemplary embodiment of the invention, the complete I/O address of a particular IDE peripheral device would be a three digit representation, in hexadecimal notation, of eight contiguous bit addresses. For example, an IDE disk drive address would range from 1F0 to 1F7, with the two most significant bit (MSB) portions (the 1F portions) indicating which peripheral apparatus (also termed, which port) is being addressed, and the least significant bit (LSB) portion (the 0 to 7 portion) indicating the port offset addresses for that peripheral. Likewise, a second IDE disk drive might be identified by the address range 170 to 177, with the two MSBs indicating the device (or port), and the LSB indicating the offset address within the device (or port).

The IDE bus has been standardized to provide for only a three bit addressing capability, while the host bus, in the host computer system, provides for a 16-bit addressing capability, giving a 64 K address range. The task of detecting the two MSBs of a peripheral device address, recognizing the MSBs as a valid peripheral address, and directing information to the appropriate peripheral is typically performed by controller circuitry, such as an I/O interface adapter, as is described in more detail below. The full 16-bit address is provided on the host system bus, from whence it is recognized by the interface adapter which responsively issues the appropriate control signals to the addressed peripheral.

Included in the control signals are the three IDE address bits, representing the hexadecimal LSB of the full peripheral address, which, in turn, address certain registers within the port. The three-bit IDE address can be seen, therefore, as representing the port offset address of each peripheral device.

Because the port offset address is represented by only three bits, it may only take on eight values, ranging from 0 to 7, corresponding to binary 000 to 111. Thus, only the first eight values in hexadecimal notation (0, 1, 2, 3, 4, 5, 6, and 7) may map to offset addresses. The remaining eight hexadecimal LSB values (8, 9, A, B, C, D, E and F) have four bit representations in binary. It is particularly noteworthy that the last three bits of the four bit binary notation of hexadecimal 8 to F are the same as the three bit binary expressions of hexadecimal 0 to 7. It will be apparent, to one skilled in the art, that the hexadecimal address range 170 to 177, will have a three-bit IDE address equivalent to the hexadecimal address range 178 to 17F.

Thus, from the foregoing, it will be clear that an IDE address comprises two portions, a first portion defined by the two hexadecimal MSBs which identifies the I/O port (the I/O peripheral of interest), and a second portion defined by the hexadecimal LSB which defines the offset address of the port (the register of interest within the peripheral).

Returning now to the description of a host write command, the host system is commanded by the applications program to write a certain amount of data to, for example, the disk drive. The host system issues a string command, over the ISA data and address bus, which is polled by, for example, an I/O interface adapter device. When the command data is addressed to a peripheral controlled by the interface adapter, the adapter recognizes the address, and sends the command data to the appropriate offset address (the appropriate register) of its peripheral device.

In this manner, the host system provides the disk drive task file with the sector count (the number of sectors of data to be written), the sector number (which sector is to be written to), the cylinder number (representing which track is to be written to) and the device/head designator (representing which disk is to be written to). The type of write command is provided to the task file, and an I/O Write is asserted to initiate the write process in the drive.

A 16-bit word of write data is written to the peripheral's 16-bit data register at offset address 0, by the host system, in response to the OUT,Ax,Dx command, during a first ISA bus cycle. In a well known manner, this data is transferred out of the data register and onto the appropriate data sector of the disk drive by the drive controller electronics.

Once this 16-bit word transfer is completed, the drive asserts a ready signal to the host system, indicating that it is ready to transfer in an additional 16-bit word. Upon receipt of the ready signal, the host system must again access the internal Ax register, and direct its contents to the address Dx during a second bus cycle.

It should be readily apparent, that in a 32-bit word data system, such as the 32-bit Windows data protocol, transferring data over a 16-bit ISA bus requires that the microprocessor's 16-bit Ax data register be accessed by two OUT commands, followed by two bus cycles during which the Ax register's data is written to the drive.

Turning now to FIG. 2, which is reproduced below as Table 2, there is shown the microprocessor and ISA bus instruction sequence required for transferring 32 bits of data from the host system to an IDE peripheral across a 16-bit ISA bus.

TABLE 2

| REGISTER CONTENT | | | ISA BUS CONTENT | |
|---|---|---|---|---|
| Ax | Dx | µP INSTRUCTION | ADDRESS | DATA |
| Word-1 | xxxx | MOV, Dx, 160 | | |
| Word-1 | 160 | OUT, Ax, Dx | | |
| Word-1 | 160 | (1st bus cycle) | 160 | Word-1 |
| Word-2 | 160 | SHR, EAx, 16 | | |
| Word-2 | 160 | OUT, Ax, Dx | | |
| Word-2 | 160 | (2d bus cycle) | 160 | Word-2 |

In FIG. 2, and Table 2, MOV,Dx,160 represents a microprocessor instruction which maps the variable Dx to a specific address 160. A first internal data out instruction step (OUT,Ax,Dx) sets up the Ax register to transmit the first 16-bit word of data to address 160, which is then performed during a first ISA bus cycle. Following the first bus cycle, the second 16-bit word is shifted into the Ax register, by a shift right command, SHR,EAx,16, which shifts the data bits in the upper register of the physical 32-bit data register (EAx) into the lower register, designated herein as Ax. A second internal data out instruction step (OUT,Ax,Dx) sets up the Ax register to transmit the second 16-bit word of data to address 160, which is performed during a second ISA bus cycle. Subsequent sequential 32-bit data words are transferred to the peripheral by sequencing OUT instructions and ISA bus cycles, until the data transfer is completed.

Thus, each 32-bit data word transfer requires two internal microprocessor instruction steps, a shift right instruction, and two ISA bus cycles.

In accordance with practice of principles of the invention, a system for transferring a 32-bit data word to an IDE peripheral device over a 16-bit ISA data bus using only a single internal microprocessor instruction step will now be described with reference to FIGS. 3, 4 and 5.

In particular, FIG. 3 depicts a preferred microprocessor and ISA bus instruction sequence required for transferring 32 bits of data from the host system to an IDE peripheral across a 16-bit ISA bus. For convenience, FIG. 3 is reproduced as Table 3, below.

TABLE 3

| REGISTER CONTENT | | | ISA BUS CONTENT | |
|---|---|---|---|---|
| EAx | Dx | µP INSTRUCTION | ADDRESS | DATA |
| Word-2 | Word-1 | xxxx MOV, Dx, 160 | | |
| Word-2 | Word-1 | 160 OUT, EAx, Dx | | |
| Word-2 | Word-1 | 160 (1st bus cycle) | 160 | Word-1 |
| Word-2 | Word-1 | 160 (2d bus cycle) | 162 | Word-2 |

In FIG. 3, and Table 3, the first microprocessor instruction, MOV,Dx,160, maps a peripheral port address 160 into an address register Dx, internal to the microprocessor, in a manner similar to the prior art sequence of FIG. and Table 2. Once the address register is loaded, an output instruction, OUT,EAx,Dx, is issued by the microprocessor.

In the embodiment of the invention, EAx is an internal register, typically provided in the Intel series x86 microprocessors, manufactured by Intel Corp. of Santa Clara, Calif. In particular, EAx is a standard internal microprocessor data register configured to contain 32-bit wide data words and which is coupled to the ISA bus in parallel fashion. An OUT,EAx,Dx instruction, therefore, directs the microprocessor to output the contents of the EAx register onto the ISA bus and direct it to the address contained in the Dx register.

Since the data portion of the ISA bus is only 16 bits wide, the 32-bit word contents of the EAx register must be output to the bus in two sequential 16-bit words. In FIG. 3 and Table 3, the first 16-bit word is transferred across the ISA bus, to address 160, during the first bus cycle following the OUT instruction. This is accomplished by the EAx register's moving out the least significant 16-bit word residing in what is conventionally termed the register lower half. Thus, the port address 160 is shown in the ISA bus address column of FIG. 3 and Table 3, and the lower register half contents, indicated as Word-1, is shown in the ISA bus data column.

Once the OUT,EAX,Dx instruction is issued, there is no need for an additional microprocessor instruction to move the most significant 16-bit word contents of the EAx register onto the ISA bus. Following the first bus cycle, during which the Word-1 register contents are transferred to port 160, the contents of the EAx register's upper half, denoted Word-2, are automatically written to the ISA bus. Completion of the first bus cycle triggers the movement of Word-2 from the EAx register onto the ISA bus, from whence it is transferred to the addressed port during a second, immediately following, bus cycle. Thus, as shown in FIG. 3 and Table 3, the upper register half contents, indicated as Word-2, is shown in the ISA bus data column.

However, the port address on the ISA bus at the second bus cycle is no longer the port address 160, mapped to the Dx register. Microcode instructions, which define the internal operation of the Intel series x86 microprocessors, automatically cause the Dx address to increment by two bits, for the second word, whenever the EAx register is read from, or written to, in two words during an OUT (or IN) instruction. Because of this operational artifact of the Intel microprocessor, Word-2 on the ISA bus is directed to port address 162 in the illustrated embodiment. Port address 162 defines the same port (16x) as the previous 160 port address, but the port offset address (xx2) now points to the sector count register of the IDE task file. This is a normally impermissible offset address for the 16-bit data word. This difficulty is solved, according to a preferred embodiment of the present invention, by modifying the IDE task file to include an extended register set which accommodates the incremental offset address.

Referring now to FIG. 4, which is reproduced below as Table 4, an extended IDE register set task file is shown in which provision is made for offset addresses up to sixteen registers. The first eight offset addresses, 0 to 7, are mapped to the standard eight registers of the IDE task file in conventional manner. An additional eight offset addresses are provided by using the next eight sequential bits in hexadecimal notation, 8, 9, A, B, C, D, E, and F.

TABLE 4

| I/O PORT OFFSET ADDRESS | I/O READ REGISTER | I/O WRITE REGISTER |
|---|---|---|
| xx0 | 16-Bit Data | 16-Bit Data |
| xx1 | Error | Features |
| xx2 | Sector Count | Sector Count |
| xx3 | Sector Num. | Sector Num. |
| xx4 | Cylinder Low | Cylinder Low |
| xx5 | Cylinder High | Cylinder High |
| xx6 | Device/Head | Device/Head |
| xx7 | Status | Command |
| xx8 | 16-bit Word-1 | 16-bit Word-1 |
| xx9 | N/A | N/A |
| xxA | 16-bit Word-2 | 16-bit Word-2 |
| xxB | N/A | N/A |
| xxC | N/A | N/A |
| xxD | N/A | N/A |
| xxE | N/A | N/A |
| xxF | N/A | N/A |

As shown in FIG. 4 and Table 4, port offset address xx8 corresponds to a 16-bit data register which is defined as the data register for receiving the first 16-bit word (Word-1) of data from the microprocessor's EAx register. A second 16-bit data register is provided for receiving the second 16-bit word (Word-2) from EAx. This register is addressed by port offset xxA, which is simply port offset xx8 incremented by two bits. The microprocessor's incrementing the port address by two bits has now been accommodated by providing two 16-bit data registers offset by the same two bit address increment.

In order to access the two 16-bit registers in the extended register set, the microprocessor OUT, or IN, instruction set is modified such that the mapping instruction, MOV, maps the address register Dx to port address 168, rather than to port address 160, when transferring data using the 32-bit EAx register. The initial mapping instruction now becomes MOV,Dx,168. During the first bus cycle, Word-1 is directed to offset address 168, and during the second bus cycle, Word-2 is directed to offset address 16A.

Port offsets xx8 and xxA are defined in the task file as pointing to 16-bit data registers. However, the task file definitions are for virtual registers which only serve to give validity to the xx8 and xxA offsets. As described above, the three LSB bits of xx8 and xxA are the same as for offsets xx0 and xx2. As is described in more detail below, logic circuitry on the I/O interface adapter reads the full port address and is able to differentiate, for example, xx8 from xx0. In the exemplary embodiment, the interface adapter recognizes that an xx8 offset address corresponds to the first 16 bits of a 32-bit word transfer. In response, the interface adapter allows the data transfer to continue, wherein the three bit IDE offset address is maintained at 0, and the 16 bits of data are directed to the physical 16-bit data register mapped by IDE offset 0.

Clearly, offset address xx8 is an alias of xx0; both having the same IDE three-bit address of 0.

When the second word, directed to port address 16A, is detected by the interface adapter, the logic circuitry recognizes the address implications of the xxA offset, and translates the IDE offset address from 2 (the three-bit alias of xxA) to 0, thus directing the second data word to the 16-bit data register.

Choosing the hexadecimal aliases of the standard task file register set offset addresses to define the offsets of the extended register set is an important feature of the embodiment of the invention. Since use of the microprocessor's EAx internal register for 32-bit data word transfer results in the second word's address being incremented by two, it is not possible to use the conventionally valid offset addresses defining the standard register set. The interface adapter would not be able to differentiate writes to the sector count register at address 162, from the second data word whose port address is incremented to 162.

This feature becomes more important when it is realized that multiple IDE devices may be connected to an ISA bus and that each IDE device may have a multiplicity of valid port addresses. For example, a multi-channel interface adapter may control IDE devices which have valid port addresses of 1F0–1F7, 170–177, 168–16F, and 1E8–1EF. It will be apparent that each of the valid address sets have a corresponding hexadecimal alias, in which the two MSBs are the same, the hexadecimal LSB differs, but whose three-bit binary representations are aliases of one another.

Thus IDE device 1F0–1F7 will have an extended register set defined by 1F8–1FF. Likewise 170–177 will extend to 178–17F, 168–16F extends to 160–167, and so forth. Each extended register set represents an offset alias of the standard register set of its corresponding port address while not conflicting with any other validly defined port.

I/O port address definitions, the extended register set definitions, and the modified microprocessor IN and OUT instructions are determined during the computer system's boot, or power—on—self—test (POST) routine, in well known fashion, by loading the appropriate instructions for the operating system from a BIOS, contained for example on the interface adapter, or alternatively from a device driver software program, invoked by a DEVICE command during execution of the DOS CONFIG.SYS file. It will also be understood by one skilled in the art that these methods are not exclusive. An appropriate device driver software program could easily be made part of an applications program, from whence it executes and provides the appropriate information to the operating system for practice of the invention.

Turning now to FIG. 5, there is shown a block diagram of a computer system, which includes an I/O interface adapter circuit useful in practice of principles of the invention. The computer system includes an instruction processing component, such as a microprocessor 10, connected to transfer binary information to and from an ISA bus 12, in parallel fashion. The microprocessor 10 is the computer's central processing unit (CPU) and is preferably a 32-bit microprocessor such as one of the Intel 80×86 series 32-bit microprocessors, manufactured by Intel Corp. of Santa Clara, Calif.

An internal 32-bit register 14 is provided in the microprocessor 10, for transmitting and receiving 32-bit data words to and from the ISA bus over a bi-directional bus 16 internal to the computer system. As is described above, the 32-bit register 14 may be viewed as being divided into two 16-bit word portions, a Word-1 portion 18 and a Word-2 portion 20, each of which is adapted for storing a 16-bit data word. An address register 22 is also provided in the microprocessor 10, for transmitting and receiving a port address to and from the ISA bus 12 over the internal bus 16.

An I/O interface adapter 24 is connected to the ISA bus 12 for facilitating the transfer of information between IDE peripheral devices, such as disk drives, CD-ROM drives, IDE tape drives, and the like, and the computer system's ISA bus 12. The I/O interface adapter is an electronic circuit board IDE controller, such as the IDE-16042 IDE controller, manufactured by Future Domain Corp, of Irvine, Calif. IDE peripheral devices, indicated generally as 26, are coupled to the interface adapter 24, in well known fashion, by means of an IDE bus comprising IDE interface cables 27 and 27a connected between the devices and cable header ports 28 and 28a provided for such purpose. Two cable header ports 28 and 28a are provided in the exemplary embodiment of FIG. 5. Each header port is commonly termed a channel, and the interface adapter of FIG. 5 is known, therefore, as a two-channel adapter. In accord with well known principles, each channel is adapted to support up to two IDE devices, connected in parallel fashion, to each corresponding IDE cable. Thus, the adapter 24 is able to support operation of up to four IDE devices.

Valid port addresses for the IDE devices are hard-wired by means of switches, or jumpers, the positions of which are recognized by, for example, a BIOS 30, which maps the switch selections to a list of valid addresses. The BIOS 30 is coupled, on one side, to the ISA bus through a buffer circuit 32, and on the other side, to the port headers 28 and 28a. Valid addresses in the BIOS are enabled, or disabled, by the user settable jumpers, or switches (not shown), depending on how many IDE devices are connected to the adapter and to which channel they are connected. Subject to selection by the user, the valid IDE port addresses are provided, by the switches or jumpers, to a host computer system, during system boot, or POST. In accord with practice of the invention, valid alias addresses are included in the valid address definitions in the switch selection.

A programmable array logic integrated circuit (PAL) 34 is coupled to the ISA bus in such a manner that it accesses the entire 16-bit wide address portion of the bus. In well known fashion, address decode circuitry in the PAL decodes port addresses received over the ISA bus, and provides appropriate address and control signals to the peripheral device connected at the addressed port, over a three-bit IDE address bus, denoted ADD(0:2), through buffer circuits 36.

The PAL 34 also includes logic circuitry for recognizing an alias offset address for a 32-bit data word, and for translating a microprocessor incremented offset address to an IDE offset address of 0, corresponding to the 16-bit data register of the IDE task file. Such circuitry is easily implemented in a variety of techniques, by one skilled in the art. Alias address recognition may be accomplished by an address decode circuit which examines the fourth least significant bit for the presence of a 0 or a 1, indicating the lower eight bits or the upper eight bits, respectively, of the 0-F hexadecimal sequence. Translation of the offset address of word-2 of a 32-bit word transfer, from 2 to 0 may be accomplished by a decrement counter, which acts on the three least significant bits of the address to provide a binary offset address of 000. Alternatively, since 000 is the required offset address of the data register, when the word-2 alias address of xx2 (or, xxA) is detected, the PAL circuitry may just as easily function to pull all three bits of the IDE address bus to ground, thus providing a binary offset address of 000. Data is transferred from the ISA bus to an addressed IDE peripheral, in 16-bit words, over a 16-bit wide data bus, denoted as DATA(0:15), through data buffer circuitry 38.

It should be noted that the data bus DATA(0:15) is a bi-directional bus, as are the ISA and IDE busses. Consequently, where the description of the preferred embodiment of the invention refers to data being transferred in one direction, a data write for example, the description is equally valid for data being transferred in the other direction. The microprocessor instruction set will include an IN,EAx, Dx instruction in the case of a data read.

The above description of a preferred embodiment of a system for a 32-bit double word IDE data transfer, provided in accordance with the invention, and its operation, is for illustrative purposes. Because of variations which will be apparent to those skilled in the art, the scope of present invention is not intended to be limited to the embodiment described above, but rather is defined by the following claims.

What is claimed is:

1. In a host computer operative in a 32-bit mode, including an ISA expansion bus configured to communicate between a host computer and an IDE peripheral storage device, the ISA bus further configured to transfer data in 16 bit words, a system for transferring data expressed as 32-bit words between the host system and a peripheral storage device adapted to transfer data in 16-bit words, the system comprising:

an IDE peripheral storage device identified by a valid I/O port address, the port address comprising at least a three-bit offset address portion, the IDE peripheral further comprising a task file defining an addressable register set, the offset address portion of the I/O port address uniquely identifying registers within the set, the register set including a 16-bit data storage register identified by a unique three-bit offset address;

a microprocessor, including a 32-bit internal data register for transferring 32-bit data words between the host computer and a peripheral storage device, the microprocessor configured to transfer a 32-bit data word between the internal data register and the ISA bus in sequential first and second 16-bit words, the microprocessor further outputting an I/O port address on the ISA bus identifying an IDE I/O port to or from which the data words are to be transferred, the I/O port address of the first 16-bit word including an offset address portion corresponding to the 16-bit data storage register, the microprocessor further incrementing the offset address portion of the second 16-bit word from the offset address portion of the first 16-bit word by a predetermined binary value, program means for defining an alias I/O port address corresponding to a valid I/O port address, the alias address comprising at least an offset address portion, wherein the program means further instructs the microprocessor to output the alias address on the ISA bus as the valid I/O port address; and an interface adapter circuit coupled between the ISA bus and the IDE peripheral storage device, the interface adapter further including;

means for recognizing the alias I/O port address; and means for translating the alias I/O port address to the valid I/O port address such that the offset address portion of the first and second 16-bit words each corresponds to the 16-bit data storage register.

2. The system of claim 1, wherein a valid I/O port address is one whose hexadecimal representation is chosen from either the group xx0, xx1, xx2, xx3, xx4, xx5, xx6, xx7, or the group xx8, xx9, xxA, xxB, xxC, xxD, xxE, xxF, where xx represents at least one hexadecimal digit which is the same for all members of both groups.

3. The system of claim 2, wherein an alias address is one whose hexadecimal representation is chosen from the group of claim 2 which was not chosen to represent a valid I/O port address.

4. The system of claim 1, wherein the three-bit offset address which uniquely identifies the data storage register is 000 in binary representation.

5. The system of claim 1, wherein program means comprises a BIOS.

6. The system of claim 1, wherein program means comprises a device driver software program.

7. A system for transferring a 32-bit data word to or from a 16-bit IDE peripheral storage device, comprising:

an addressable IDE peripheral storage device including a 16-bit physical data register, the IDE device addressable by a hexadecimal I/O port address, the IDE device further comprising;

an addressable register set, each register in the set being uniquely identified by an offset address, the offset address being the least significant three-bits of the I/O port address, the register set including;

a first 16-bit data register, corresponding to said physical register, the first data register addressed by a first least significant three-bits corresponding to a first three-bit binary value;

a second 16-bit data register addressed by a second least significant three-bits, unequal to the first least significant three-bits, corresponding to said first three-bit binary value; and a third 16-bit data register addressed by a third least significant three-bits corresponding to a second three-bit binary value;

means for recognizing said second and third least significant three-bits;

means for translating said second and third least significant three-bits addresses such that content addressed to the second and third 16-bit data registers is directed to the physical register corresponding to the first 16-bit data register.

8. The system of claim 7, wherein said first least significant three-bits is one whose representation is chosen from either the group xx0, xx1, xx2, xx3, xx4, xx5, xx6, xx7, or the group xx8, xx9, xxA, xxB, xxC, xxD, xxE, xxF, where xx represents at least one hexadecimal digit which is the same for all members of both groups.

9. The system of claim 8, wherein said second and third least significant three-bits are ones whose representation is chosen from the group of claim 9 which was not chosen to represent said first least significant three-bits.

10. The system of claim 7, wherein said first threebit binary value for addressing said first 16-bit data register is 000.

11. A system for transferring data expressed as 32-bit words between a host personal computer operative in a 32-bit mode and a peripheral storage device defining an I/O port address and adapted to transfer data as 16-bit words over an IDE bus, wherein data to be transferred is stored in an addressable register in the peripheral device in response to a first I/O port address, the system comprising:

microprocessor means, responsive to a microprocessor instruction, for transferring 32-bit data words to or from said peripheral storage device, the microprocessor means transferring 32-bit data words in two sequential 16-bit words without an intervening instruction, the first word being transferred in association with the first I/O port address defining said addressable register, the microprocessor means further incrementing the I/O port address associated with the second 16-bit word; and an interface adapter coupled between the microprocessor and the IDE peripheral storage device, the interface adapter further including;

means for recognizing an incremented port address; and means for translating the incremented port address to the first port address defining the addressable register.

12. In a host computer operative in a 32-bit mode, including an ISA expansion bus configured to communicate between a host computer and an IDE peripheral storage device, the ISA bus further configured to transfer data in 16 bit words, a system for transferring data expressed as 32-bit words between the host system and a peripheral storage device adapted to transfer data in 16-bit words, the system comprising:

an IDE peripheral storage device identified by a valid I/O port address, the port address comprising at least a three-bit offset address portion, the IDE peripheral further comprising a task file defining an addressable register set, the offset address portion of the I/O port address uniquely identifying registers within the set, the register set including a 16-bit data storage register identified by a unique three-bit offset address, the offset address being the least significant octal bit of the I/O port address, the register set including;

a first 16-bit data register, corresponding to said physical register, the first data register addressed by a first least significant octal bit corresponding to a first three-bit binary value;

a second 16-bit data register addressed by a second least significant octal bit, unequal to the first least significant octal bit, corresponding to said first three-bit binary value; and a third 16-bit data register addressed by a third least significant octal bit corresponding to a second three-bit binary value;

a microprocessor, including a 32-bit internal data register for transferring 32-bit data words between the host computer and a peripheral storage device, the microprocessor configured to transfer a 32-bit data word between the internal data register and the ISA bus in sequential first and second 16-bit words, the microprocessor further outputting an I/O port address on the ISA bus identifying an IDE I/O port to or from which the data words are to be transferred, the I/O port address of the first 16-bit word including an offset address portion corresponding to the 16-bit data storage register, the microprocessor further incrementing the offset address portion of the second 16-bit word from the offset address portion of the first 16-bit word by a predetermined binary value, program means for defining an alias I/O port address corresponding to a valid I/O port address, the alias address comprising at least an offset address portion, wherein the program means further instructs the microprocessor to output the alias address on the ISA bus as the valid I/O port address;

an interface adapter circuit coupled between the ISA bus and the IDE peripheral storage device, the interface adapter further including;

means for recognizing the alias I/O port address; and means for translating the alias I/O port address to the valid I/O port address such that the offset address portion of the first and second 16-bit words each corresponds to the 16-bit data storage register.

* * * * *

UNITED STATES PATENT AND TRADEMARK OFFICE
CERTIFICATE OF CORRECTION

PATENT NO. : 5,802,392
DATED : September 1, 1998
INVENTOR(S) : Jeffrey E. Epstein; Mark F. Heppenstall It is certified that error appears in the above-identified patent and that said Letters Patent is hereby corrected as shown below:

Column 1, line 56, change "16 -bit" to -- 16-bit --.
Column 1, line 61, change "Intel Corp.." to -- Intel Corp. --.
Column 6, line 26, replace "FIG. and Table 2" with -- FIG. 2 and Table 2 --.
Column 6, line 50, replace "OUT,EAX,Dx" with -- OUT,EAx,Dx --.
Column 8, line 49, replace "power—on—self—test" with
    -- power-on-self-test --.
Column 10, line 25, after "scope of" insert -- the --.
Column 11, line 66, change "group of claim 9" to -- group of claim 8 --.
Column 12, line 1, change "threebit" to -- three-bit --.

Signed and Sealed this

Nineteenth Day of October, 1999

Attest:

Q. TODD DICKINSON

Attesting Officer

Acting Commissioner of Patents and Trademarks